(12) United States Patent
Sonobe

(10) Patent No.: US 10,767,400 B2
(45) Date of Patent: Sep. 8, 2020

(54) ADVANCING/RETREATING MOVEMENT DEVICE

(71) Applicant: HI-LEX CORPORATION, Takarazuka-shi (JP)

(72) Inventor: Hiroshi Sonobe, Takarazuka (JP)

(73) Assignee: HI-LEX CORPORATION, Takarazuka-shi (JP)

( * ) Notice: Subject to any disclaimer, the term of this patent is extended or adjusted under 35 U.S.C. 154(b) by 329 days.

(21) Appl. No.: 15/516,217

(22) PCT Filed: Oct. 6, 2015

(86) PCT No.: PCT/JP2015/078349
§ 371 (c)(1),
(2) Date: Mar. 31, 2017

(87) PCT Pub. No.: WO2016/056551
PCT Pub. Date: Apr. 14, 2016

(65) Prior Publication Data
US 2017/0306665 A1 Oct. 26, 2017

(30) Foreign Application Priority Data
Oct. 8, 2014 (JP) ................................. 2014-206867

(51) Int. Cl.
*E05B 83/34* (2014.01)
*B60K 15/00* (2006.01)
(Continued)

(52) U.S. Cl.
CPC .............. *E05B 83/34* (2013.01); *B60K 15/00* (2013.01); *B60K 15/05* (2013.01); *E05B 81/25* (2013.01);
(Continued)

(58) Field of Classification Search
CPC ......... E05B 83/34; E05B 81/25; B60K 15/00; B60K 15/05; B60K 2015/0561; B60K 2015/0576; B60K 15/0515; F15H 25/08
See application file for complete search history.

(56) References Cited

U.S. PATENT DOCUMENTS

2003/0222476 A1* 12/2003 Park ....................... B60K 15/05
296/97.22
2004/0049987 A1* 3/2004 Hirano ...................... B60J 5/06
49/360
(Continued)

FOREIGN PATENT DOCUMENTS

JP 2011-80338 A1 4/2011

OTHER PUBLICATIONS

International Search Report for International Application No. PCT/JP2015/078349 dated Dec. 15, 2015.

*Primary Examiner* — Nathan Cumar
(74) *Attorney, Agent, or Firm* — Kratz, Quintos & Hanson, LLP

(57) ABSTRACT

An advancing/retreating movement mechanism 1 of an advancing/retreating member includes: a lifter 3; a coil spring 5; a lock pin 7 that limits the movement of the lifter 3; a case 2 that accommodates the lifter 3 and the coil spring 5; an advance/retreat position control mechanism 9 that controls an advance position, a retreat position, and a reciprocating movement of the lifter 3; and a receiving seat 11 that receives the coil spring 5 so that the lifter 3 is biased. The receiving seat 11 is arranged in a rearward position side of the lifter 3. An engaging part 27a engaging the lock pin 7 is arranged to the lifter 3. When the lifter 3 moves to the retreat position, the engaging part 27a moves to a rearward side beyond the receiving seat 11 and moves to a position where the engaging part 27a can be engaged with the lock
(Continued)

pin 7. Therefore, the size of the advancing/retreating member in a protruding/withdrawing direction can be made small.

3 Claims, 8 Drawing Sheets

(51) Int. Cl.
*B60K 15/05* (2006.01)
*E05B 81/24* (2014.01)
(52) U.S. Cl.
CPC ............... *B60K 2015/0561* (2013.01); *B60K 2015/0576* (2013.01)

(56) References Cited

U.S. PATENT DOCUMENTS

2009/0139991 A1\* 6/2009 Nakaya .................. B60K 15/05
 220/315
2010/0045049 A1\* 2/2010 Persiani ................. B60K 15/05
 292/14

\* cited by examiner

ADVANCING/RETREATING MOVEMENT DEVICE

TECHNICAL FIELD

The present invention relates to an advancing/retreating movement mechanism, particularly an advancing/retreating movement mechanism in which an advancing/retreating member including an engaging part with which a limiting member engages, moves to an engaging position while resisting an biasing force of an biasing member.

BACKGROUND ART

An open/close control mechanism of a fuel lid makes a plunger protrude/withdraw movement by opening/closing of the fuel lid. In the open/close control mechanism of the fuel lid, a locking mechanism is used to prevent the fuel lid from opening by protrusion of the plunger while a vehicle is traveling. In the locking mechanism, when a door of the vehicle is locked, the plunger is restricted at a withdraw position immovable in synchronization with the lock. To be specific, the locking mechanism includes a fitting part which can be fit into a part to be fitted of the plunger, and the part to be fit is positioned at a place where the part to be fit cannot be fit into the fitting part when the plunger is at a protrusion position. When the plunger moves from the protrusion position to the withdraw position, the part to be fitted moves to a position where the part to be fitted can be fit into the fitting part, and then, the fitting part fits into the part to be fitted. As a result, the protrusion motion of the plunger is restricted and the fuel lid is prevented from opening while a vehicle is traveling (for example, refer to Patent Literature 1).

CITATION LIST

Patent Literature

Patent Literature 1: JP 2011-80338 A

SUMMARY OF INVENTION

Technical Problem

In the prior art, a plunger is subjected to a large compression force of, for example, a coil spring when moving to a withdraw position (retreat position). As a result, when fitting is released, the plunger moves to a protrusion position (advance position) by the large compression force of the coil spring. Here, in order to ensure such an engagement, the plunger and the coil spring are arranged in series. In order to arrange apart to be fitted of the plunger and the coil spring so as not to overlap, the size of the plunger of an open/close control mechanism in a protruding/withdrawing direction becomes large.

A problem to be solved of the present invention is to reduce the size of the advancing/retreating member in an advancing/retreating direction in an advancing/retreating movement mechanism.

Solution to Problem

The advancing/retreating movement mechanism of the advancing/retreating member according to one aspect of the present invention includes: an advancing/retreating member; an biasing member; a limiting member that limits a movement of the advancing/retreating member; a case that accommodates the advancing/retreating member and the biasing member; an advance/retreat position control mechanism that controls an advance position, a retreat position, and a reciprocating movement of the advancing/retreating member; and a receiving seat that receives the biasing member so as to bias the advancing/retreating member. The receiving seat is arranged in a rearward position side of the advancing/retreating member. An engaging part that engages with the limiting member is arranged to the advancing/retreating member. When the advancing/retreating member moves to the retreat position, the engaging part moves to a rearward side beyond the receiving seat and moves to a position capable of being engaged with the limiting member. In this mechanism, when the advancing/retreating member moves to the retreat position, the limiting member engages with the engaging part of the advancing/retreating member afterwards. Therefore, the movement of the advancing/retreating member from the retreat position is restricted. Moreover, the advancing/retreating member can be moved to the advance position by the limiting member when engagement of the limiting member with the advancing/retreating member is released. In this mechanism, the engaging part of the advancing/retreating member and a receiving part that receives the biasing member are arranged so that the engaging part moves in a rearward side beyond the receiving seat when the advancing/retreating member is moving to the retreat position. That is, the biasing member and the receiving part and the part where the engaging part of the advancing/retreating member is provided are not arranged in an advance/retreat direction. Therefore, the size of the advancing/retreating movement mechanism in the advancing/retreating direction becomes small.

The advance/retreat position control mechanism is arranged at the retreat position side of the advancing/retreating member away from an advancing/retreating movement axis of the advancing/retreating member, and the biasing member is arranged at the retreat position side of the advancing/retreating member and may be accommodated in a space formed by the advance/retreat position control mechanism and the case. In this mechanism, the biasing member is accommodated in the space formed by the advance/retreat position control mechanism and the case; therefore, there is no need for a special member for accommodating the biasing member. Therefore, the number of members is small and furthermore, the entire body is made small.

The advance/retreat position control mechanism includes: a restricting part that restricts a movement of advance/retreat; and a plate-shaped guiding part that guides the restricting part. The advancing/retreating member may be moved to an advance position and a retreat position by the restricting part being guided by the guiding part to an advance side position and a retreat side position. In this case, when the advancing/retreating member moves to the advance position and the retreat position, the guiding part is configured to slide with respect to the case. In this mechanism, the guiding part is made to move so as to slide on the case when the advancing/retreating member moves to an advance position and a retreat position. Therefore, the movement of the guiding part in the advancing/retreating direction is stable.

Advantageous Effects of Invention

In an advancing/retreating movement mechanism according to the present invention, the size of the advancing/retreating member in an advancing/retreating direction is reduced.

DESCRIPTION OF EMBODIMENT (1) Car Body

Figure 1:
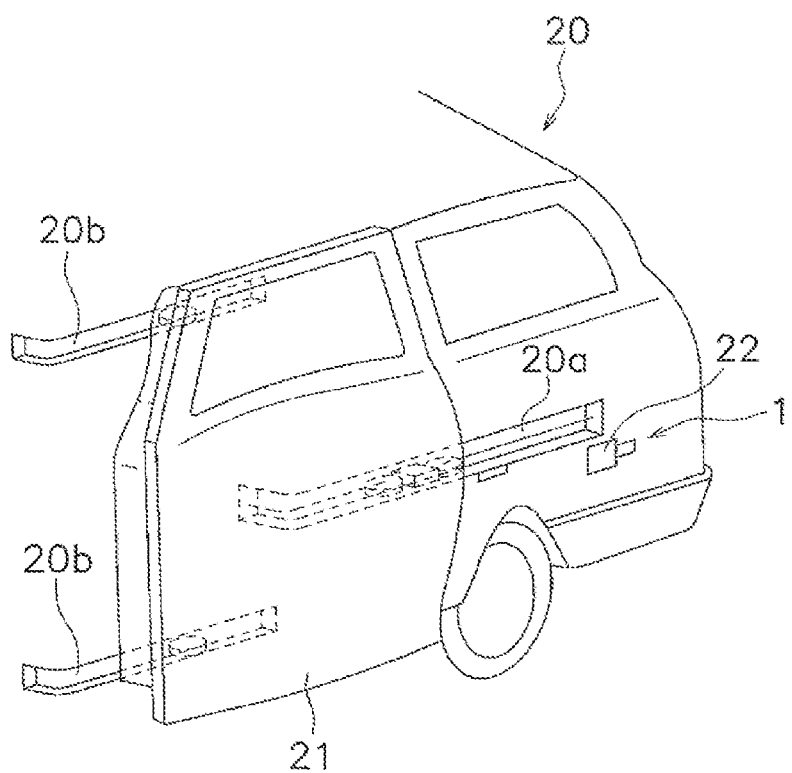
FIG. 1 is a schematic view illustrating a position where an embodiment of the present invention is used in a car body.

First, the car body using an advancing/retreating movement mechanism 1 will be described with reference to FIG. 1. FIG. 1 is a schematic view illustrating a position where an embodiment of the present invention is used in the car body. The advancing/retreating movement mechanism 1 is used for, for example, a one-box type car body 20 and the like. A slide door 21 is arranged on a side of the car body 20 and slides along a rail 20a at the center and rails 20b arranged at upper and lower ends of the car body 20. In addition, a fuel lid 22 is arranged on a side of the car body 20 rearward of the slide door 21. The advancing/retreating movement mechanism 1 described below is arranged near the fuel lid 22.

(2) Description of Outline of Advancing/Retreating Movement Mechanism

Figure 2:
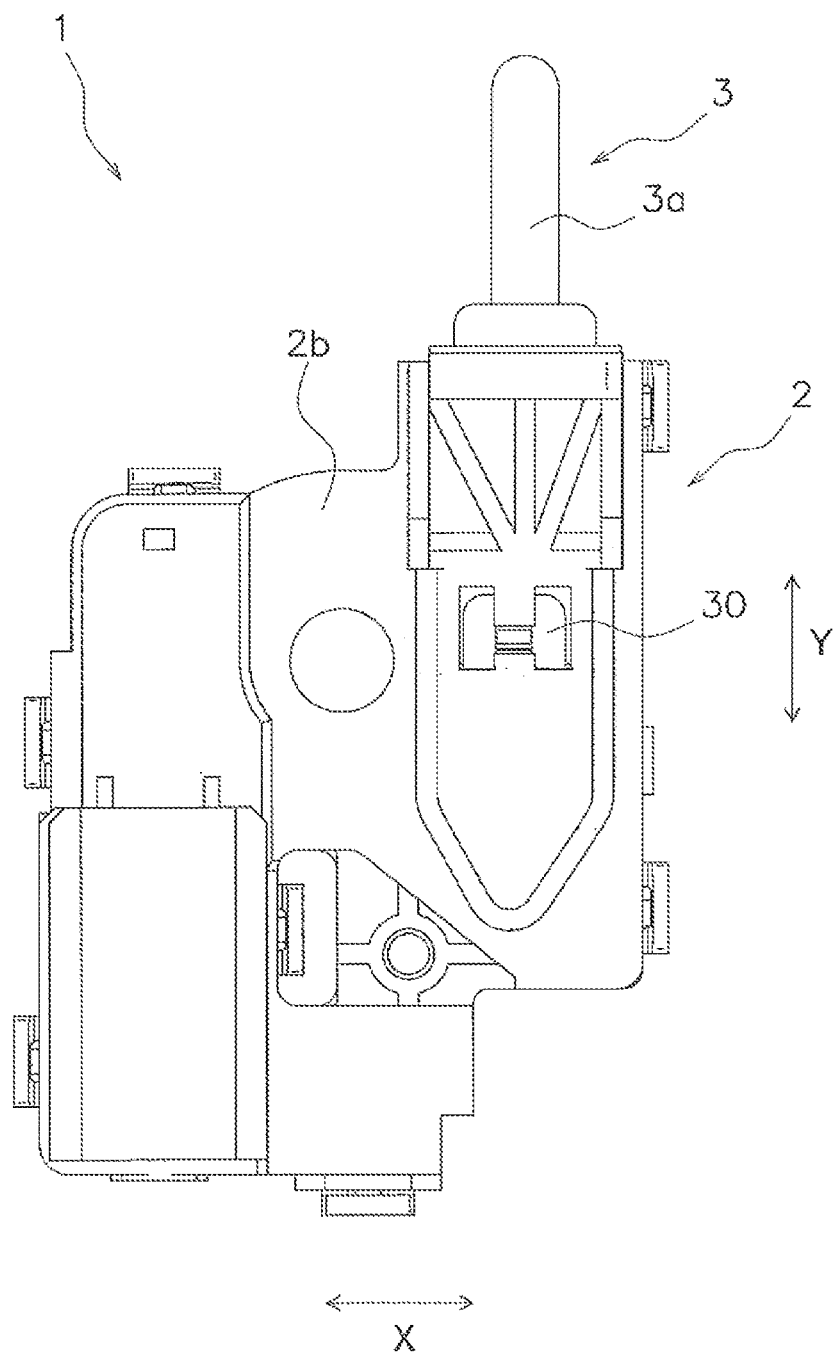
FIG. 2 is a plan view of an advancing/retreating movement mechanism according to the embodiment of the present invention.
Figure 3:
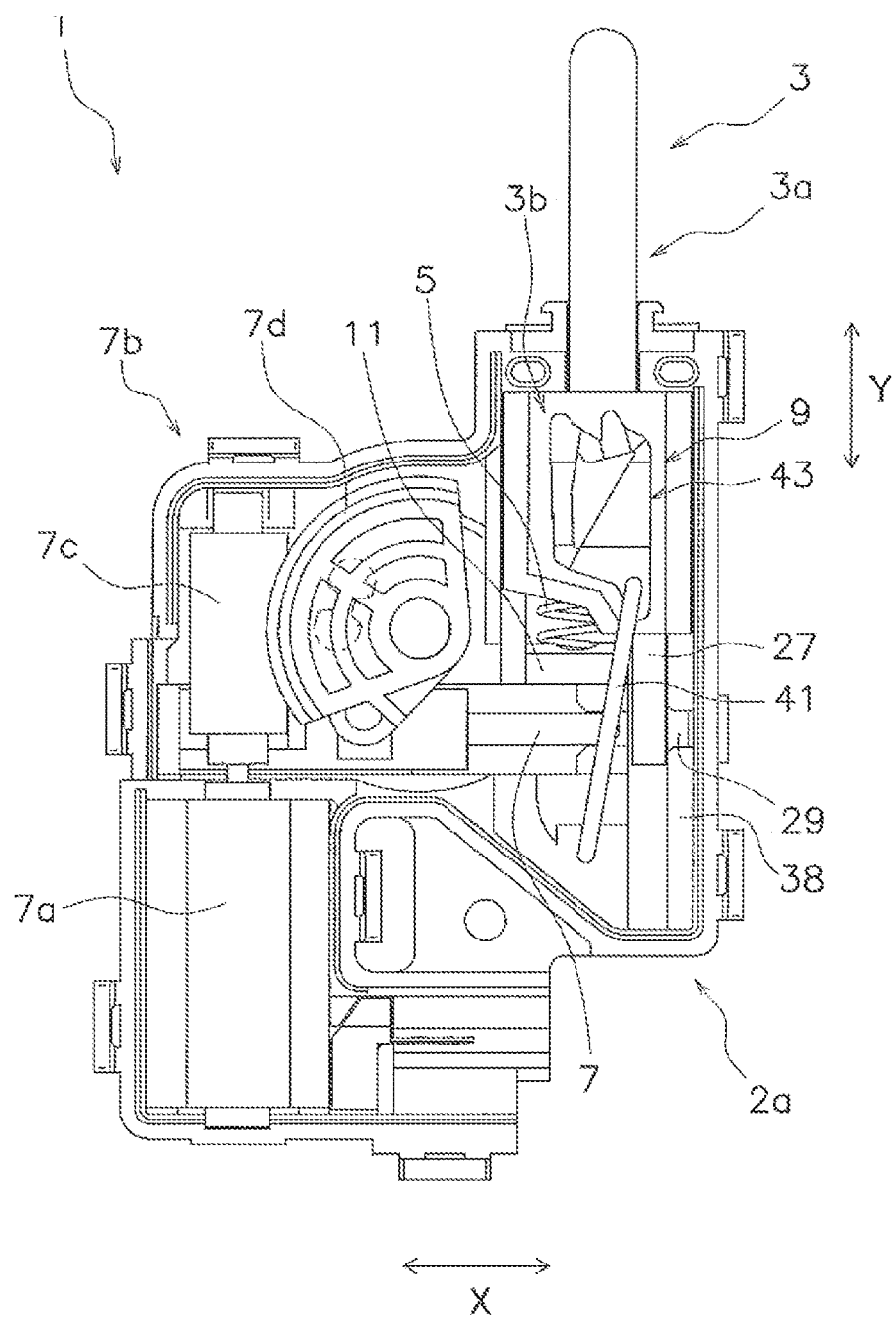
FIG. 3 is a plan view of the inside of the advancing/retreating movement mechanism in FIG. 2.
Figure 4:
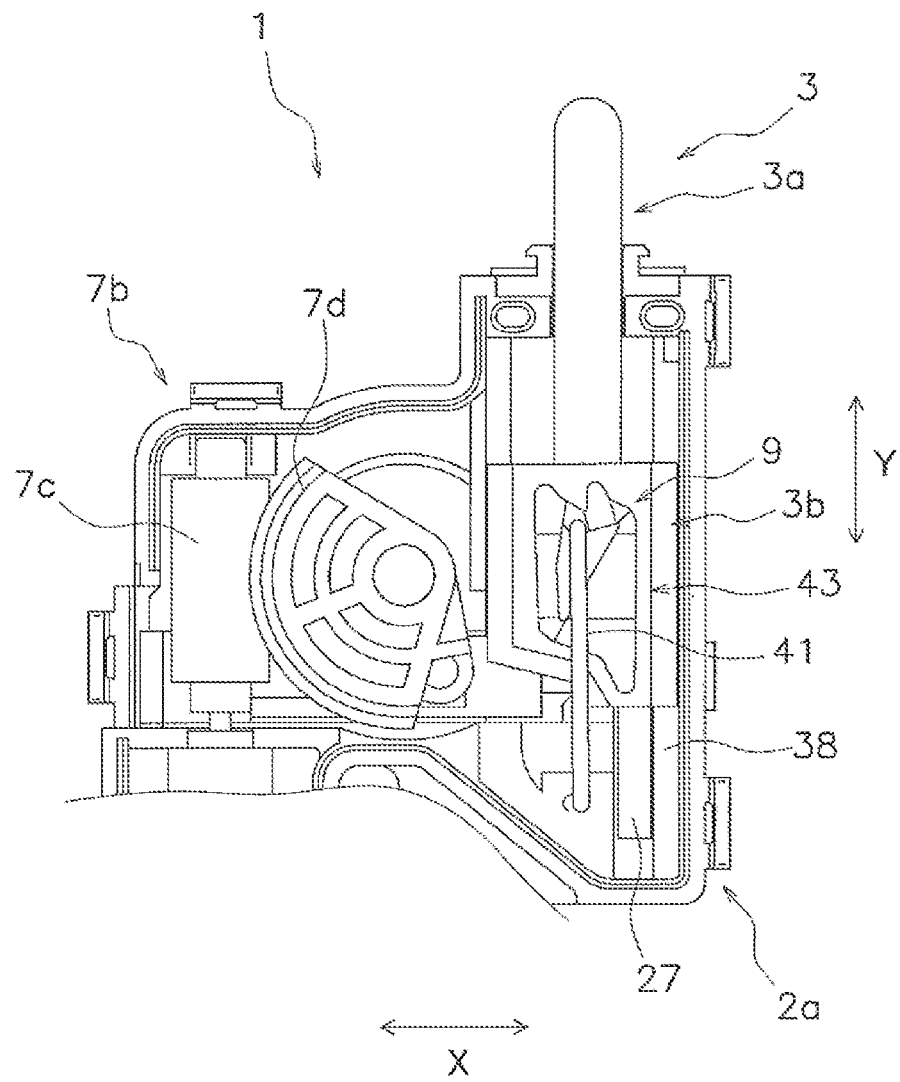
FIG. 4 is a plan view of the inside of the advancing/retreating movement mechanism in FIG. 2.
Figure 5:
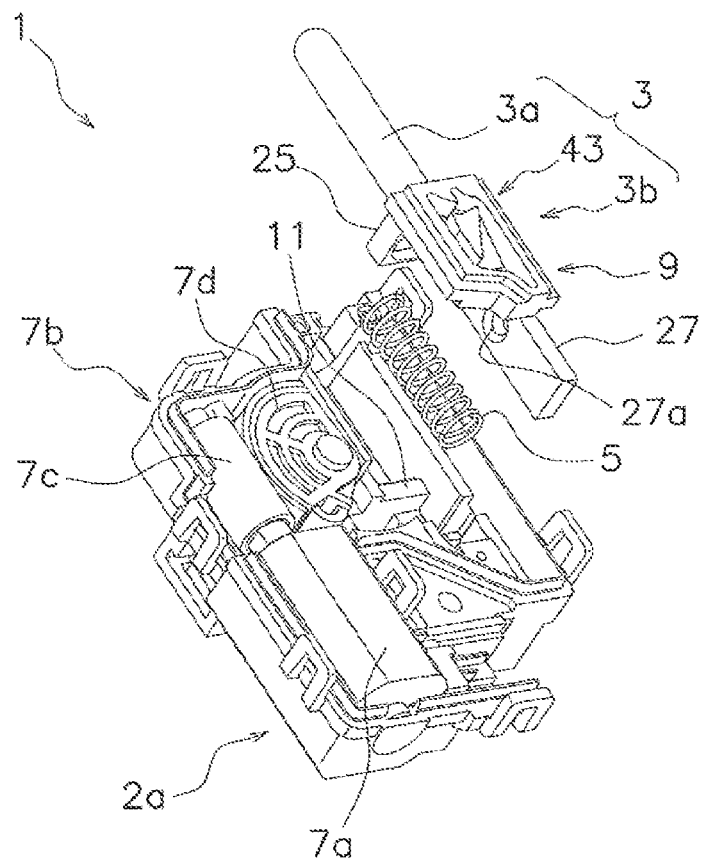
FIG. 5 is a perspective view illustrating an assembly state of the advancing/retreating movement mechanism in FIG. 2.
Figure 6:
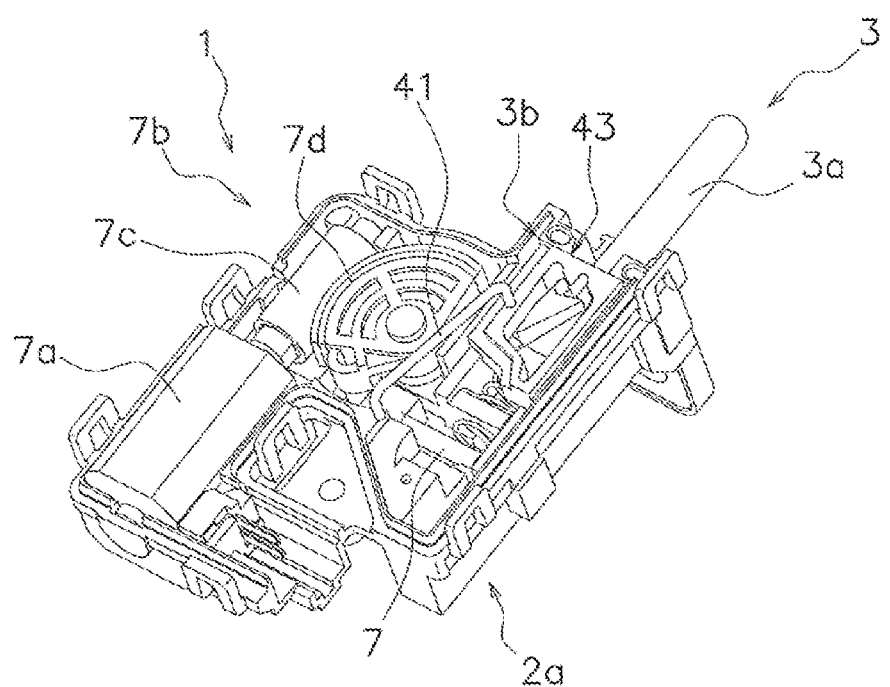
FIG. 6 is a perspective view illustrating the assembly state of the advancing/retreating movement mechanism in FIG. 2.
Figure 7:
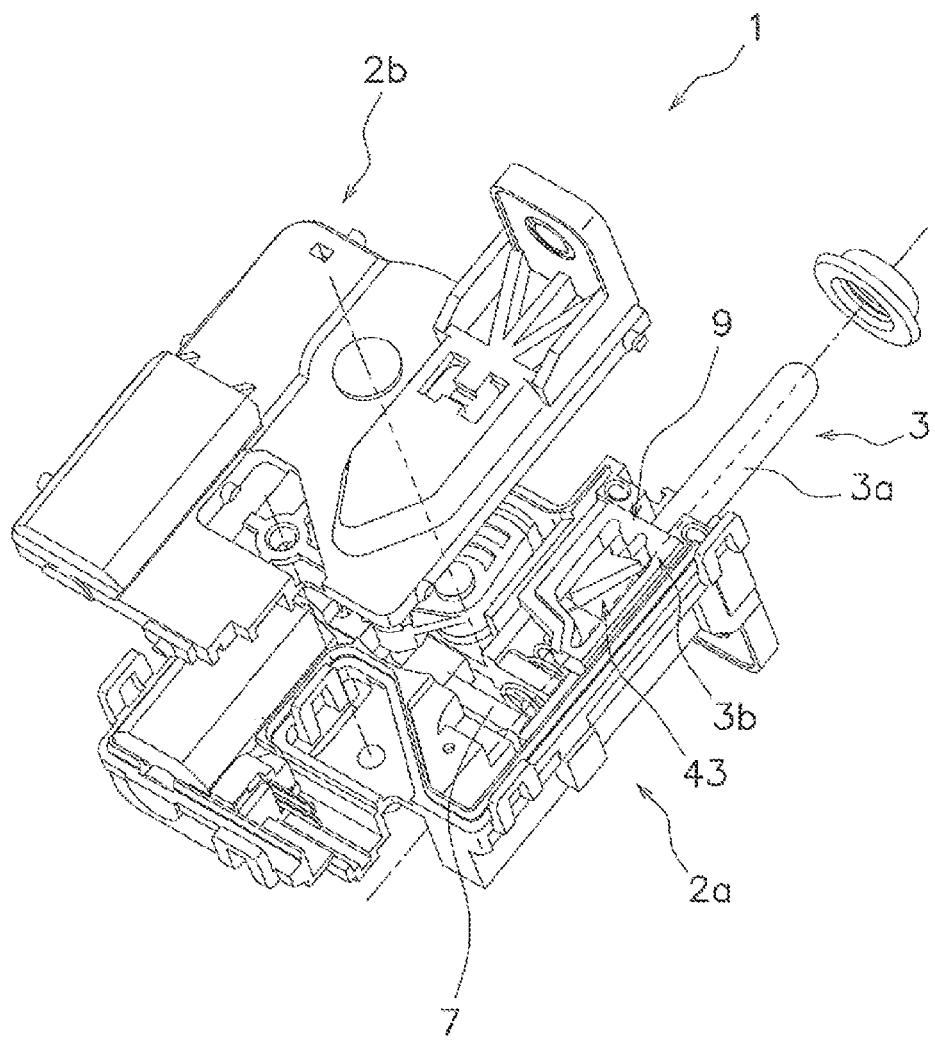
FIG. 7 is a perspective view illustrating the assembly state of the advancing/retreating movement mechanism in FIG. 2.

The advancing/retreating movement mechanism 1 of an advancing/retreating member as an advancing/retreating movement mechanism will be described using FIGS. 2 to 7. FIG. 2 is a plan view of the advancing/retreating movement mechanism according to the embodiment of the present invention. FIGS. 3 and 4 are plan views of the inside of the advancing/retreating movement mechanism. FIGS. 5 to 7 are perspective views illustrating an assembly state of the advancing/retreating movement mechanism. Note that in the description below, the horizontal direction in FIGS. 2 to 4 is a first direction X and the vertical direction in FIGS. 2 to 4 is a second direction Y (advance direction/retreat direction). The advancing/retreating movement mechanism 1 is configured to be fixed to a retreat position by pressing an advancing/retreating member, and returns to an advance position by pressing the advancing/retreating member again. Moreover, in the advancing/retreating movement mechanism 1, the advancing/retreating member can be locked at the retreat position.

The advancing/retreating movement mechanism 1 includes: a lifter 3 as the advancing/retreating member; a coil spring 5 as an biasing member; a lock pin 7 as a limiting member for limiting movement of the lifter 3; an advance/retreat position control mechanism 9 that controls an advance position, a retreat position, and a reciprocating movement of the lifter 3; and a receiving seat 11 as a receiving seat for receiving the coil spring 5 so that the lifter 3 is biased. The receiving seat 11 is a member for receiving the coil spring 5 so that the lifter 3 is biased. The receiving seat 11 may be any structure as long as the coil spring 5 can generate an biasing force. The coil spring contacting with the receiving seat 11 may have the biasing force direction for biasing the lifter 3, by the position of the receiving seat 11, either in a lower side of the second direction Y (retreat direction) or an upper side of the second direction Y (advance direction) as long as the coil spring biases the advancing/retreating member so that the advancing/retreating movement mechanism 1 exerts a predetermined function. In this embodiment, the biasing force that the coil spring 5 generates is a pushing force. The receiving seat 11 is arranged on a lower side of the second direction Y of the lifter 3 with respect to the lifter 3. An engaging part 27a engaging the lock pin 7 is arranged to the lifter 3. When the lifter 3 moves to the retreat position, the engaging part 27a moves to the lower side of the second direction Y (rearward side) beyond the receiving seat 11 and moves to a position where the engaging part 27a can be engaged with the lock pin 7.

(3) Description of Detail of Advancing/Retreating Movement Mechanism

The advancing/retreating movement mechanism 1 will be described further in detail. The advancing/retreating movement mechanism 1 as an advancing/retreating movement mechanism is a mechanism enabling the movement of the lifter 3, functions as an actuator for the fuel lid 22 in this embodiment, and is also applicable to other structures, for example, a power lid or a door.

The advancing/retreating movement mechanism 1 includes a case 2. The case 2 is a housing accommodating various kinds of members and a device, and the lifter 3 is arranged to be able to enter and exit at one end of the case 2 along the second direction Y. More specifically, the case 2 includes a bottomed tubular main body 2a in which side walls are erected from the periphery of the bottom plate and a lid 2b attached to a top opening of the main body 2a. The case 2 accommodates the lifter 3 and the coil spring 5. To be specific, a portion of the lifter 3 is accommodated in the case 2 so that the lifter 3 can move between a locked position and an unlocked position in the case 2.

The lifter 3 as an advancing/retreating member is a member which can work a reciprocating movement to enter and exit at a specific place. The direction of a reciprocating motion may be in a line or an arc. In this embodiment, the lifter 3 performs a line reciprocating motion in which the lifter 3 is protruded outside the case 2 or withdrawn inside the case 2 by opening/closing movement of the fuel lid 22 (refer to FIG. 1). The lifter 3 includes a rod-shaped part 3a in which a tip side thereof is made to protrude outside from side walls of the case 2 and an end thereof is extended inside the case 2 and an extending part 3b extending in an extending direction of the rod-shaped part from an end part of the rod-shaped part 3a and housed inside the case 2. The extending part 3b includes the advance/retreat position control mechanism 9 mentioned above. The advance/retreat position control mechanism 9 is arranged to a part of a lower side of the second direction Y (retreat position side) of the lifter 3, away from an advancing/retreating movement axis of the lifter 3. More specifically, the extending part 3b further includes a receiving seat 25 and a plate-shaped part 27. The receiving seat 25 is a part in contact with one end of the coil spring 5. The plate-shaped part 27 has a plate-shaped structure extending long in the second direction Y from one side of the first direction X of the receiving seat 25. The advance/retreat position control mechanism 9 includes a flat surface 35 (mentioned below) arranged to the receiving seat 25 side. A shielding structure covering one part of the coil spring 5 is achieved by the receiving seat 25, the plate-shaped part 27, and the flat surface 35 mentioned above.

The lock pin 7 as a limiting member is a member for limiting movement of the lifter 3 engaging with the lifter 3, may have any shape as long as the lock pin 7 can achieve the function thereof, and is a rod-shaped member in this embodiment. The lock pin 7 is arranged near the lifter 3. The lock pin 7 moves in a direction approaching the lifter 3 by driving of a motor 7a in synchronization with the locking of the slide door 21. Also, the lock pin 7 moves in a direction away from the lifter 3 by the driving of the motor 7a in synchronization with the unlocking of the slide door 21. That is, the lock pin 7 can work a reciprocating movement in the first direction X. As a structure for driving the lock pin 7, the motor 7a and a power transmission mechanism 7b are included. The power transmission mechanism 7b includes a worm gear 7c and a worm wheel 7d.

Note that in the main body 2a of the case 2 at a position corresponding to the lock pin 7, a recess part 29 is formed away from the lock pin 7 to the right side of the first direction X. Thus, a tip of the lock pin 7 is inserted into the recess part 29 and supported when the lock pin 7 penetrates the engaging part 27a of the lifter 3 as mentioned below. In this case, movement or deformation of the lock pin 7 hardly occurs due to both sides of the lock pin 7 being supported by the case 2. Also, movement of the lifter 3 is further strongly suppressed due to engagement of the tip of the lock pin 7. Note that the recess part 29 can be a hole or omitted. The coil spring 5 as an biasing member just has to be able to generate an biasing force, and another spring, such as a leaf spring, may be used. The coil spring 5 is always biased in a direction in which the lifter 3 protrudes. Thus, the lifter 3 is biased toward the advance position. The coil spring 5 is arranged at the lower side (retreat position side) of the second direction Y of the lifter 3 and is accommodated in a space formed by the receiving seat 25, the advance/retreat position control mechanism 9 (especially, a plate-shaped part where a control cam part 43 is formed) and the case 2. This space is configured such that the coil spring 5 does not move away from a predetermined position. One end of the coil spring 5 contacts with the receiving seat 11 of the case 2 (refer to FIG. 3 and FIGS. 9 to 11) and the other end is locked to the receiving seat 25 of the lifter 3. The receiving seat 11 is arranged in a rearward position side of the second direction Y of the lifter 3.

In this mechanism, the coil spring 5 is accommodated in the space formed by the advance/retreat position control mechanism 9 and the case 2; therefore, there is no need for a special member for supporting the surrounding of the coil spring 5. Therefore, the number of members is small and furthermore, the entire body is made small. An engaging part 27a engaging the lock pin 7 is arranged to the lifter 3. The engaging part 27a is a hole formed at the retreat position side portion of the lifter 3, and in this embodiment, is a through hole formed at the plate-shaped part 27 of the lifter 3. The engaging part 27a just needs to be able to engage with the lock pin 7, and therefore, the shape of the engaging part 27a may be a groove or a recess, and the presence or absence of penetration is also not limited.

Figure 9:
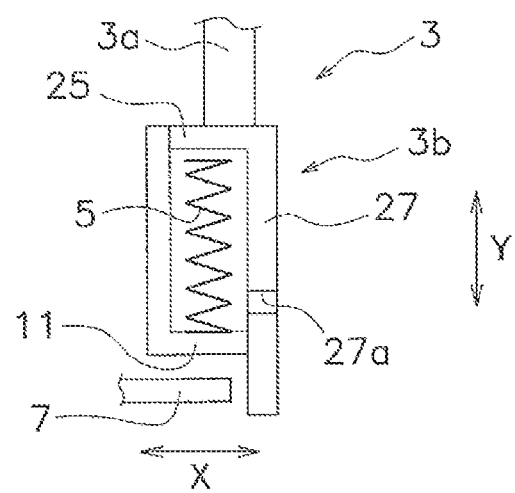
FIG. 9 is a schematic view illustrating an arrangement relationship of each member when a lifter is at an advance position.
Figure 10:
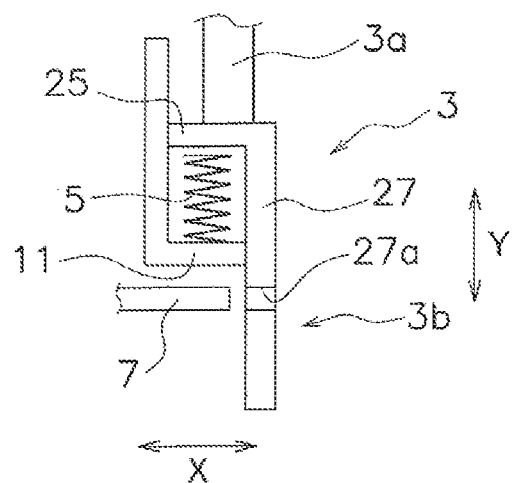
FIG. 10 is a schematic view illustrating an arrangement relationship of each member when the lifter is at a retreat position.
Figure 11:
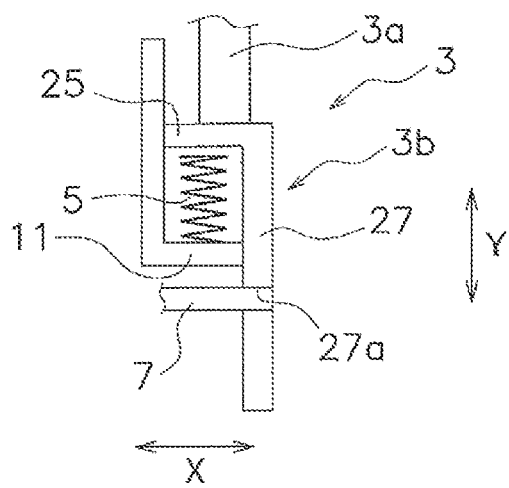
FIG. 11 is a schematic view illustrating the arrangement relationship of each member when the lifter is at the retreat position.

As illustrated in FIGS. 3 and 9, when the lifter 3 is in the advance position, the engaging part 27a is arranged at the upper side of the second direction Y (advance position side) with respect to the receiving seat 11. Also, the engaging part 27a is arranged at a position where the engaging part 27a can pass through the receiving seat 11 when moving in the second direction Y. More specifically, as illustrated in FIG. 9, the engaging part 27a is arranged at a position in the second direction Y such that the engaging part 27a is within the second direction Y of the coil spring 5, i.e., the engaging part 27a is at a different position in the first direction X and overlaps in the second direction Y with respect to the coil spring 5. Moreover, as illustrated in FIGS. 4, 10, and 11, when the lifter 3 is at the retreat position, the engaging part 27a is arranged at the lower side of the second direction Y (retreat position side) with respect to the receiving seat 11, and corresponds to a position of the lock pin 7 in the second direction Y in this state. Note that although a tip of the rod-shaped part 3a of the lifter 3 protrudes from the case 2 in the retreat position, the tip may wholly be accommodated.

The advance/retreat position control mechanism 9 is a mechanism which controls the movement of the lifter 3. To be specific, the advance/retreat position control mechanism 9 is a mechanism in which when the lifter 3 is pushed into the case 2, the lifter 3 is locked at the position, and when the lifter 3 is pushed into the case 2 again from the locked position, the lock is released and the lifter 3 is made to protrude from the case 2. The advance/retreat position control mechanism 9 (especially the control cam part 43) is arranged at the lower side (retreat position side) of the second direction Y of the lifter 3, away from the advancing/ retreating movement axis (to be specific, the center of the rod-shaped part 3a) of the lifter 3.

The advance/retreat position control mechanism 9 includes a lifter pin 41 that restricts the advance and retreat movement of the lifter 3 and the plate-shaped control cam part 43 that guides the lifter pin 41. The lifter 3 moves to the advance position and the retreat position by the lifter pin 41 guided to the advance side position and the retreat side position by the control cam part 43. For the control cam part 43, a cam already known can be used and a so-called heart-shaped plate cam can be used. In this case, when the lifter 3 moves to the advance position and the retreat position, the control cam part 43 is configured to slide with respect to the case 2. To be specific, the right side portion of the second direction of the control cam part 43 slides on a side wall 38 of the case 2 (refer to FIGS. 3 to 5) and the left side portion of the second direction of the control cam part 43 slides on the other side wall of the case 2 (no sign). As a result, backlash during sliding of the lifter 3 is suppressed. Note that the structure of the side of the case 2 where the control cam part 43 slides just has to include a guiding surface, and may achieve a guiding structure using a groove or a protrusion. By the guiding structure that guides the control cam part 43 arranged at the case 2, the movement of the control cam part 43 is guided in the first direction. Therefore, the advancing/retreating movement of the lifter 3 is made smooth with an easy configuration. Note that the guiding surface at the side of the case 2 may be single or plural.

Figure 8:
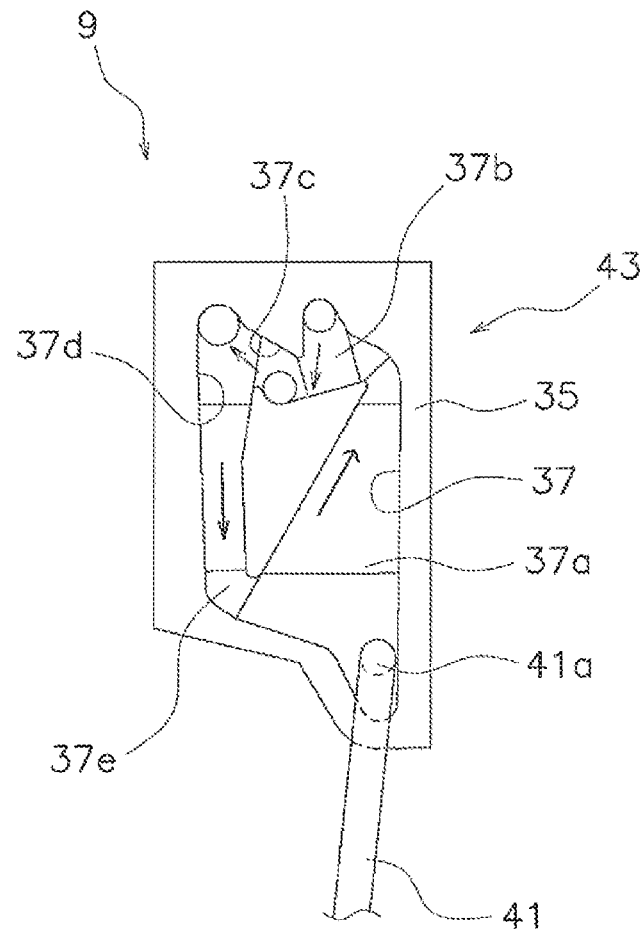
FIG. 8 is a plan view of an advance/retreat position control mechanism.

The lifter pin 41 as a restriction part is a restriction pin. The movement of the lifter 3 to the advance position and the retreat position is restricted by the lifter pin 41. A proximal end of the lifter pin 41 is locked to the case 2, and may be locked at any position as long as the advancing/retreating movement of the lifter 3 can be restricted to stop at a predetermined position. The control cam part 43 as a guiding part is a control cam part arranged to the lifter 3 and has a structure to guide the lifter pin 41 to the locked position and the unlocked position. A tip side of the lifter pin 41 extends to the control cam part 43 side, and a bent part 41a is formed at an extending end of the lifter pin 41. As illustrated in FIG. 8, the control cam part 43 guides the bent part 41a of the lifter pin 41 by the inner shape of the cam in the flat surface 35. FIG. 8 is a plan view of the advance/retreat position control mechanism. The spring force of the lifter pin 41 functions to always push the tip end part of the bent part 41a against a bottom surface of a groove part 37 mentioned below, of the control cam part 43 and the tip end of the lifter pin 41 engages with the control cam part 43 such that the tip end can slide on the control cam part 43. The control cam part 43 includes an annular groove part 37 formed on the flat surface 35, and the groove part 37 is a substantially a heart shape, but may be another shape. Moreover, the groove part 37 includes a first groove part 37a, a second groove part 37b, a third groove part 37c, and a fourth groove part 37d that are different in depth, respectively. The first groove part 37a is deeper than the flat surface 35, the second groove part 37b is deeper than the first groove part 37a, the third groove part 37c is deeper than the second groove part 37b, and the fourth groove part 37d is deeper than the third groove part 37c. Note that a slope 37e is formed between the fourth groove part 37d and the first groove part 37a.

In such a control cam part 43, the bent part 41a of the lifter pin 41 moves to the first groove part 37a, the second groove part 37b, the third groove part 37c, and the fourth groove part 37d in a circulating path indicated by arrows. Note that the movement in the circulating path of the bent part 41a of the lifter pin 41 is caused by repetition of a retreat motion and protrusion motion of the lifter 3. When the bent part 41a of the lifter pin 41 is arranged at the first groove part 37a (unlocked position), the lifter 3 is maximally protruded and becomes a protrusion maintaining state. When the bent part 41a is arranged at the third groove part 37c (locked position), the lifter 3 is maximally retreated and goes into a withdraw maintaining state. Therefore, in this mechanism, the protrusion maintaining state (the lifter 3 is at the advance position) and the withdraw maintaining state (the lifter 3 is at the retreat position) are alternately switched by repeating a pushing operation to the lifter 3. As illustrated in FIG. 2, a leaf spring 30 is attached to the lid 2b and the leaf spring 30 biases the lifter pin 41 downward. As a result, the lifter pin 41 hardly comes off from the control cam part 43. Also, the lifter 3 is pushed against a bottom surface of the main body 2a.

(4) Movement of the Advancing/Retreating Movement Mechanism

Next, the movement of the advancing/retreating movement mechanism 1 will be described using FIGS. 9 to 11. FIG. 9 is a schematic view illustrating an arrangement relationship of each member when the lifter is at the advance position. FIGS. 10 and 11 are schematic views illustrating arrangement relationships of each member when the lifter is at the retreat position. With the fuel lid 22 (refer to FIG. 1) opened, as illustrated in FIG. 9, the lifter 3 is protruded from the case 2 (in the advance/retreat position control mechanism 9, the bent part 41a is arranged at the first groove part 37a). In this state, the engaging part 27a of the lifter 3 is positioned at an upper side of the second direction Y higher than the lock pin 7 and the receiving seat 11.

When the fuel lid 22 (refer to FIG. 1) is closed, as illustrated in FIG. 10, the lifter 3 is withdrawn into the case 2 (in the advance/retreat position control mechanism 9, the bent part 41a has moved to the third groove part 37c and restricts the movement of the lifter 3). During this movement, the engaging part 27a of the lifter 3 moves to the lower side of the second direction Y beyond the receiving seat 11, the engaging part 27a that has been blocked to be engaged by the coil spring 5 is exposed, and comes to a position corresponding to the lock pin 7 at the end. In this embodiment, the lifter 3 is stopped by the lifter pin 41 and the control cam part 43 when the engaging part 27a moves to a position where the engaging part 27a can be engaged with the lock pin 7 as described. However, the lifter 3 does not necessarily have to be stopped. If the slide door 21 is locked in this state, as illustrated in FIG. 11, the lock pin 7 moves to the right side of the first direction X by the motor 7a in synchronization with the lock and engages with the engaging part 27a of the lifter 3. Therefore, for example, a protrusion of the lifter 3 is prevented while a vehicle is traveling.

If the slide door 21 (refer to FIG. 1) is unlocked in this state, the lock pin 7 moves to the left side of the first direction X by the motor 7a in synchronization with the unlock and separates from the engaging part 27a of the lifter 3. Next, If the lifter 3 is further pushed by an external force in this state and then when the external force is released, the lifter 3 protrudes from the case 2 (in the advance/retreat position control mechanism 9, the bent part 41a moves to the first groove part 37a). As a result, the lifter 3 pushes away the fuel lid 22 outward and the fuel lid 22 opens, so that refueling can be performed.

(5) Operational Effect of Advancing/Retreating Movement Mechanism

As described above, in this mechanism, when the lifter 3 moves to the retreat position, the lock pin 7 then engages with the engaging part 27a of the lifter 3. Therefore, the movement of the lifter 3 from the retreat position is restricted. Moreover, the lifter 3 can be moved to the advance position by engagement of the lock pin 7 with the lifter 3 being released. Also, as described above, in this mechanism, the engaging part 27a of the lifter 3 and the receiving seat 11 receiving the coil spring 5 are arranged such that when the lifter 3 is moving to the retreat position, the engaging part 27a moves rearwards beyond the receiving seat 11. That is, the coil spring 5 and the receiving seat 11, and the part where the engaging part 27a of the lifter 3 is provided are not arranged in an advance/retreat direction. Therefore, the size of the advancing/retreating movement mechanism 1 in the advancing/retreating direction becomes small.

(6) Other Embodiment

Although one embodiment of the present invention has been described above, the present invention is not limited to the above embodiment, and various modifications are possible as long as they do not depart from the gist of the invention. In particular, embodiments and modifications described in the description can be arbitrarily combined as necessary.

INDUSTRIAL APPLICABILITY

The present invention can be applied to a fuel lid open/close mechanism of a vehicle.

REFERENCE SIGNS LIST 1 advancing/retreating movement mechanism
2 case
2a main body
2b lid
3 lifter
3a rod-shaped part
3b extending part
5 coil spring
7 lock pin
7a motor
7b power transmission mechanism
7c worm gear
7d worm wheel
9 advance/retreat position control mechanism
11 receiving seat
20 car body
20a rail
20b rail
21 slide door
22 fuel lid
25 receiving seat
27 plate-shaped part
27a engaging part
29 hole part
30 leaf spring
35 flat surface
37 groove part
37a first groove part
37b second groove part
37c third groove part
37d fourth groove part
37e slope
38 side walls
41 lifter pin
41a bent part
43 control cam part
X first direction
Y second direction

The invention claimed is:

1. An advancing/retreating movement device comprising:
   an advancing/retreating member;
   an biasing member;
   a limiting member that limits a movement of the advancing/retreating member;
   a case that accommodates the advancing/retreating member and the biasing member;
   an advance/retreat position control mechanism that controls an advance position, a retreat position, and a reciprocating movement of the advancing/retreating member, wherein the advance/retreat position control mechanism comprises a restricting part that restricts a movement of advance/retreat of the advancing/retreating member and a cam part, which guides the restricting part and further suppresses backlash during the advance/retreat movement of the advancing/retreating member; and
   a receiving seat that receives the biasing member so as to bias the advancing/retreating member, wherein
   the receiving seat is arranged at a rearward position side of the advancing/retreating member,
   an engaging part that engages with the limiting member is arranged at the advancing/retreating member, the engaging part moves to a rearward side beyond the receiving seat when the advancing/retreating member moves to the retreat position and further moves to a position where the advancing/retreating member can be engaged with the limiting member.

2. The advancing/retreating movement device according to claim 1, wherein
   the advance/retreat position control mechanism is arranged at the retreat position side of the advancing/retreating member, away from an advancing/retreating movement axis of the advancing/retreating member, and
   the biasing member is arranged at the retreat position side of the advancing/retreating member and accommodated in a space formed by the advance/retreat position control mechanism and the case.

3. The advancing/retreating movement device according to claim 2, wherein the advance/retreat position control mechanism further comprises a plate-shaped guiding part that guides the restricting part, the advancing/retreating member is moved to an advance position and a retreat position by the restricting part being guided by the guiding part to an advance side position and a retreat side position, and
   the guiding part is made to move so as to slide on the case when the advancing/retreating member moves to an advance position and a retreat position.

* * * * *